Sept. 4, 1928.

H. A. SELAH 1,683,413

CONDUIT FITTING

Filed April 15, 1925

INVENTOR
Howard A. Selah
By
ATTORNEY

Patented Sept. 4, 1928.

1,683,413

UNITED STATES PATENT OFFICE.

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed April 15, 1925. Serial No. 23,348.

This invention is designed to improve conduit fittings and is exemplified in the form of a conduit box. It is particularly desirable in relation to conduit fittings adapted to engage and connect threadless conduits. With such devices if contractible sleeves are used for engaging a threadless conduit and such sleeves are provided with slits which extend to the inner end of the sleeve the slit forms a sharp edge which may be objectionable because of its possibility of cutting the insulation on inserted wires as they are drawn over the edge. The present invention provides a collapsible sleeve with a continuous annular inner end so as to prevent any such abrasion, or cutting of the insulation. It is also desirable where such a sleeve is used to lock the same against rotation. This can be preferably done with a minimum of material by forming a flat, or out of round portion in the opening in which the sleeve is formed so as to engage the sleeve and lock it against rotation. The present invention contemplates such a means of engaging such a sleeve. Other features and details of the invention will appear from the specification and claims.

The invention is illustrated in the accompanying drawings as follows:—

Figure 1:
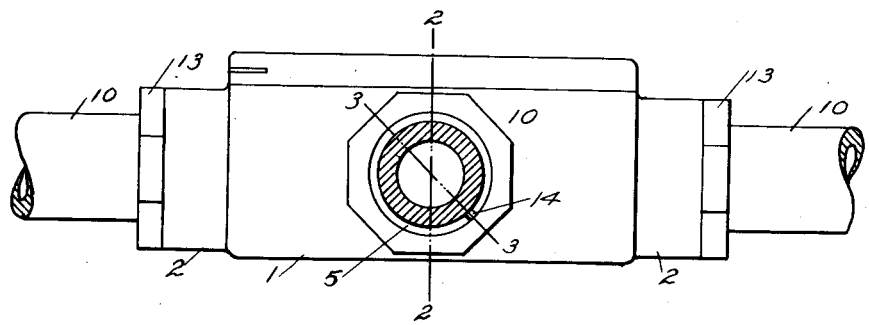

Fig. 1 shows a side elevation of a conduit box.

Figure 2:
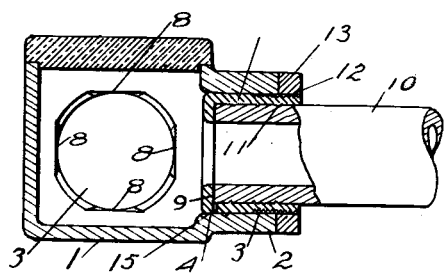

Fig. 2 a section on the line 2—2 in Fig. 1, the end pipe connections being removed showing the conduit receiving opening of the box in elevation.

Figure 3:
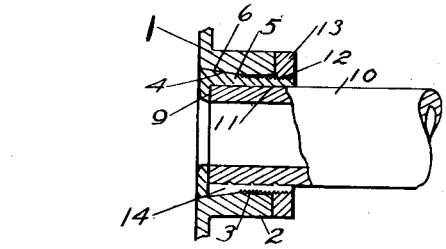

Fig. 3 a section of the opening on the line 3—3 in Fig. 1.

Figure 4:
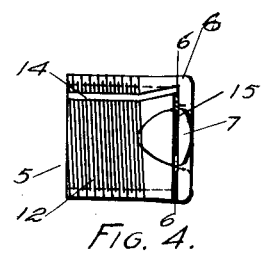

Fig. 4 a side elevation of a contractible sleeve.

Figure 5:
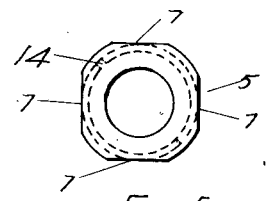

Fig. 5 an end view of the same.

Figure 6:
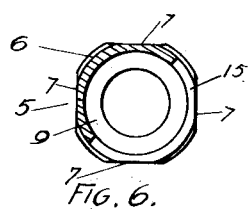

Fig. 6 a section on the line 6—6 in Fig. 4.

1 marks the body of the box, and 2 an extension on the box in which an opening 3 is arranged. The opening has a tapered end 4 and a sleeve 5 is arranged within the opening. The sleeve has a tapered end 6 in which flats 7 are arranged and the tapered portion 4 of the opening 3 is provided with corresponding flats 8 so that when the contractible sleeve is placed in the socket the flats 7 engage the flats 8 and lock the sleeve against turning but do not in any way interfere with the contraction of the sleeve. The sleeve is provided with a shoulder 9 and is adapted to receive a threadless conduit 10. The sleeve is preferably provided with slight ribs 11 which penetrate the insulation usually found on a conduit so as to assure an electrical connection between the box and the conduit. The sleeve is provided with screw threads 12 and a nut 13 is arranged at the outer end of the sleeve for drawing the sleeve into the opening.

In order to make the sleeve readily contractible I provide the axial slit 14 which extends from the outer end of the sleeve inwardly. The slit terminates in a horizontal slit 15, the horizontal slit extending preferably about half around the sleeve. This permits a ready contraction of the sleeve and at the same time affords a continuous annulus at the inner end of the sleeve.

What I claim as new is:—

1. In a conduit fitting, the combination of a body having a conduit receiving opening therein; and a contractible sleeve in the opening, the walls of the opening and the sleeve having wedging surfaces and a screw thread at its smaller end, the wedging surfaces contracting the sleeve into clamping engagement with an inserted conduit when the sleeve is drawn axially through the action of the screw and the sleeve having an axial slot extending from its outer end inwardly and a circumferential slot extending from the axial slot, the inner surface of the end of the sleeve presenting a continuous wall.

2. In a conduit fitting, the combination of a body having a conduit receiving opening therein; and a contractible sleeve in the opening, the walls of the opening and the sleeve having wedging surfaces and a screw thread at its smaller end, the wedging surfaces contracting the sleeve into clamping engagement with an inserted conduit when the sleeve is drawn axially through the action of the screw and the sleeve having an axial slot extending from its outer end inwardly and a circumferential slot extending from the axial slot, the inner end of the sleeve having a radially inwardly extending guard shoulder presenting a continuous inner wall.

3. In a conduit fitting, the combination of a body having a conduit receiving opening therein; and a contractible sleeve in the opening, the walls of the opening and the sleeve having wedging surfaces with the inner ends the larger, the smaller end of the sleeve being screw-threaded, the wedging surfaces contracting the sleeve into clamping engagement with an inserted conduit when drawn axially through the action of the screw and the sleeve having an axial slot extending from its outer end inwardly and a circumferential slot extending from the axial slot, the inner surface of the end of the sleeve presenting a continuous wall.

4. In a conduit fitting, the combination of a body having a conduit receiving opening therein; and a contractible sleeve in the opening, the walls of the opening and the sleeve having wedging surfaces, with the inner ends the larger, the smaller end of the sleeve being screw-threaded, the wedging surfaces contracting the sleeve into clamping engagement with an inserted conduit when drawn axially through the action of the screw and the sleeve having an axial slot extending from its outer end inwardly and a circumferential slot extending from the axial slot, the inner end of the sleeve having a radially inwardly extending guard shoulder presenting a continuous inner wall.

5. A contractible sleeve for conduit fittings, said sleeve being exteriorly screw-threaded at its smaller end and having a continuous annular lead surface at its inner end and provided with a circumferential slot toward its inner end with an axially extending slot extending from the circumferential slot through its outer end, said slots making the part of the sleeve through which the axial slot extends contractible and adapted to clamp, when contracted, an inserted conduit with the continuous lead surface in advance of the end of the conduit.

6. A contractible sleeve for conduit fittings, said sleeve being exteriorly screw-threaded at its smaller end and having a continuous annular lead surface at its inner end, said lead surface being arranged at the inner periphery of a radially inwardly extending guard shoulder and a circumferential slot extending along the guard shoulder with an axially extending slot extending from the circumferential slot through the outer end of the sleeve, said slot making said sleeve contractible and adapted to clamp, when contracted, an inserted conduit with a continuous lead surface and guard shoulder in advance of the end of the conduit.

In testimony whereof I have hereunto set my hand.

HOWARD A. SELAH.